United States Patent [19]

Fujiwara et al.

[11] 4,316,228
[45] Feb. 16, 1982

[54] MAGNETIC HEAD

[75] Inventors: Hideo Fujiwara, Tachikawa; Mitsuhiro Kudo, Hamuramachi; Teizou Tamura, Katsuta; Nobuyuki Sugishita, Yokosuka; Yoshihiro Shiroishi, Higashimurayama; Takeshi Kimura, Kokubunji; Kiminari Shinagawa, Shiroyamachi; Noriyuki Kumasaka, Ohme, all of Japan

[73] Assignee: Hitachi, Ltd., Tokyo, Japan

[21] Appl. No.: 100,027

[22] Filed: Dec. 3, 1979

[30] Foreign Application Priority Data

Mar. 23, 1979 [JP] Japan .................................. 54/33316

[51] Int. Cl.³ .......................... G11B 5/251; G11B 5/14
[52] U.S. Cl. ..................................... 360/127; 360/120
[58] Field of Search ................................. 360/127, 120

[56] References Cited

U.S. PATENT DOCUMENTS

| 3,674,944 | 7/1972 | Temura et al. | 360/127 |
| 3,810,245 | 5/1974 | Ozawa et al. | 360/127 |
| 3,813,693 | 5/1974 | Gooch et al. | 360/127 |
| 3,931,642 | 1/1976 | Kugimiya et al. | 360/127 |

Primary Examiner—Robert S. Tupper
Attorney, Agent, or Firm—Craig and Antonelli

[57] ABSTRACT

In a magnetic head a single-crystal Mn—Zn ferrite is employed as a core material, and cut-away parts in the vicinities of a gap are filled with a glass the contraction rate of which is lower than that of the ferrite. A principal magnetic circuit-forming plane of the core is brought into agreement with the {1 1 0} plane of the ferrite, while an angle $\theta$ defined between the <1 0 0> direction within the {1 1 0} plane of the ferrite and a gap forming plane is made 5°–40° or 80°–120°. The magnetic head thus constructed exhibits very favorable write and read characteristics.

7 Claims, 7 Drawing Figures

MAGNETIC HEAD

BACKGROUND OF THE INVENTION (i) Field of the Invention

This invention relates to a magnetic head for magnetic recording apparatus (hereinafter referred to as "magnetic head"). More particularly, it relates to a magnetic head having a magnetic core in which two magnetic blocks of high permeability are opposed to each other with a gap intervening therebetween in its portion facing a magnetic recording medium, at least one of the magnetic blocks being made of a single-crystal ferrite.

(ii) Brief Description of the Prior Art

At the present time there is a large demand for advancing the magnetic recording technology, and especially for increasing the magnetic recording density. In complying with this demand, improvements of the recording characteristics and reproducing sensitivity of a magnetic head are important subjects, along with enhancement of the coercive force and magnetic flux density of a magnetic recording medium and reduction of noise thereof.

A magnetic head which is often used at present is as shown by way of example in FIG. 1. A magnetic core is so constructed that blocks 11 and 11' made of a high-permeability magnetic material are joined through a gap 12 so as to define a coil winding window 10. Coils 13 and 13' are wound on the magnetic core. It is generally well known that, especially when a single-crystal ferrite is employed as the high-permeability magnetic material to form the magnetic core, a magnetic head which is excellent in both high-frequency characteristics and wear resistance is obtained. Usually an Mn—Zn ferrite having a cubic structure is used as the single-crystal ferrite. Depending upon the composition of constituent elements, this ferrite exhibits a magnetic anisotropy in which the $<1\,0\,0>$ direction or $<1\,1\,1>$ direction is an easy axis of magnetization.

As to how the crystal axes are to be arranged in the magnetic core of the magnetic head, there is presently no established guiding doctrine because many items have not been studied yet.

It is natural that the performance of the magnetic head is dependent upon the distribution of magnetic reluctances in the magnetic core. It is difficult, however, to obtain detailed information on the situations of variations in magnetic characteristics attributed to the facing of the ferrite, especially the working of parts proximate to the gap which intensely dominate the characteristics of the magnetic head. It is very difficult to predict the working conditions of the head and the arrangment of crystal orientations under which a certain distribution of magnetic reluctances is realized. Further, even if they are predictable, it is extremely difficult, even with a current computer of high performance, to compute how the axes of magnetic anisotropy ought to be arranged in the gap portion in order to obtain the best write and read characteristics. The principal cause for the circumstances that a desirable arrangement of the crystal axes in the magnetic core is indefinite in the extreme exists, it can be said, in this point.

The following references are cited to show the state of the art:

(i) Japanese Official Patent Gazette, Patent Application Publication No. 10027/1968;

(ii) Japanese Official Patent Gazette, Patent Application Publication No. 10028/1968; and (iii) N. Sawasaki, "VTR" (1973), pages 56 and 57, published by Corona Publishing Co., Ltd., Tokyo, Japan.

SUMMARY OF THE INVENTION

An object of this invention is to provide a magnetic head of especially excellent write and read characteristics by skillfully exploiting the magnetic anisotropy of a ferrite forming a magnetic core.

This invention has been reached as the result of research for solving the problems described above, and consists in providing a magnetic head which has significantly improved write and read characteristics as compared with prior-art magnetic heads of the same typed.

In order to accomplish this and other objects, the magnetic head according to this invention is so constructed that two magnetic blocks of high permeability opposing to each other with a gap intervening therebetween are comprised such that at least one of the magnetic blocks of high permeability is made of a single-crystal Mn—Zn ferrite. The $\{1\,1\,0\}$ plane of the at least one single-crystal Mn—Zn ferrite is made substantially parallel with a plane including a principal magnetic circuit, while an angle $\theta$ defined between the $<1\,0\,0>$ direction existing within the $\{1\,1\,0\}$ plane and a plane forming the gap, that is, an angle $\theta$ defined between the $<1\,0\,0>$ direction within the $\{1\,1\,0\}$ plane of the ferrite and the intersection line of the gap forming plane and the plane including the principal magnetic circuit is made 5°–40° or 80°–120°. Also, a glass which is lower than the Mn—Zn ferrite in its contraction rate in the case of lowering temperatures from a glass setting temperature to room temperature (hereinbelow, simply termed the "contraction rate") is attached by fusion onto at least those surfaces of the magnetic blocks of high permeability which are close to sides of the gap.

The single-crystal Mn—Zn ferrite has a magnetocrystalline anisotropy constant of $-2\times10^4$ to $1\times10^4$ erg/cc, and more desirably a magnetocrystalline anisotropy constant of $-1.5\times10^4$ to $8\times10^3$ erg/cc. The magnetic head according to this invention consists in that the glass whose contraction rate is lower than that of the ferrite is fused and attached onto at least the ferrite surfaces in the vicinity of the gap portion (except the plane facing a magnetic recording medium and the gap forming plane), thereby to generate a tensile stress within the ferrite in the vicinity of the gap. The magnetic anisotropy of the ferrite is controlled owing to the presence of the tensile stress, and the write and read characteristics are enhanced by exploiting the controlled magnetic anisotropy. However, when the magnetocrystalline anisotropy constant of the ferrite falls outside the range specified above, a desirable magnetic anisotropy cannot be attained even in the presence of the tensile stress, and the effect of this invention cannot be expected.

In order to apply a tension to a ferrite plane and thus induce a uniaxial anisotropy within the plane, the particular plane must be made parallel to the $\{1\,1\,0\}$ plane. In a case of applying a compressive stress, the uniaxial anisotropy is induced even with another plane. However, the application of this stress by the fused and attached glass is unpractical because a tensile stress acts on the glass so that the glass is prone to crack. The ferrite plane on which the glass is fused and attached consists mainly of substantially the plane including the principal magnetic circuit. After all, in order to apply a tension to a ferrite plane and thus induce the uniaxial anisotropy within the plane, the plane including the principal magnetic circuit needs to be made substantially parallel to the {1 1 0} plane. This is the reason why, in the magnetic head of the invention, the {1 1 0} plane of the single-crystal Mn—Zn ferrite is made substantially parallel to the plane including the principal magnetic circuit.

The sides "in the vicinity of the gap" described above shall consist mainly of side surfaces which are substantially parallel to the plane including the principal magnetic circuit and shall indicate regions which have radii of approximately d to approximately 10 d about the points of intersection between the side surfaces and the intersecting line of the plane facing the magnetic recording medium and the gap forming plane. Herein, d denotes the depth of the gap forming plane and is illustrated in FIG. 3. When the glass is attached by fusion onto the side surfaces lying within the extent of the range from the gap forming plane, the magnetic anisotropy of the ferrite can be controlled so that the performance of the magnetic head may improve sufficiently. In addition, the vicinity of the side of the gap corresponds to the side of a well-known, narrowed track width determining portion in the magnetic portion.

The magnetic head according to this invention has the two magnetic blocks of high permeability opposing to each other through the gap, at least one of the magnetic blocks being made of the single-crystal Mn—Zn ferrite. Since the single-crystal Mn—Zn ferrite is excellent as the magnetic core material as stated previously, it is ordinarily more desirable that both of the two magnetic blocks of high permeability are made of the single-crystal Mn—Zn ferrite. Likewise, the magnetic head according to this invention must have at least one of the blocks of the single-crystal Mn—Zn ferrite meet the requisite of the crystal orientation, and it is more preferable that both of the two blocks of the single-crystal Mn—Zn ferrite satisfy the crystal orientation requisite.

The glass to be attached by fusion near the sides of the gap is usually packed in the cut-away parts of the magnetic core which are provided in this portion as is well known. Normally, such cut-away parts are formed for the purpose of narrowing the track width.

The angle $\theta$ within the range of 5°–40° or 80°–120° as noted above provides better write and read characteristics for the magnetic head according to this invention than those of the prior-art magnetic head. An angle $\theta$ within a range of 10°–35° or 85°–115° achieves further improved write and read characteristics, an angle $\theta$ within 20°–30° or 95°–105° achieves even more excellent write and read characteristics, and an angle $\theta$ equal to about 25° or about 100° produces the most favorable result. In a case where the angle $\theta$ lies outside the range of 5°–40° or 80°–120°, only write and read characteristics equivalent to or inferior to those of the prior art are obtained.

When the contraction rate of the glass is lower than that of the single-crystal Mn—Zn ferrite used, write and read characteristics which are superior to those of the prior art can be expected. In contrast, when the contraction rate of the glass is equal to or higher than that of the ferrite, the superior characteristics cannot be expected. When the difference between the contraction rate of the glass and that of the ferrite is $1.3 \times 10^{-3}$ or greater, cracks sometimes develop in the vicinity of the gap, and the available percentage of yield in the fabrication of the magnetic heads may become lower. It is accordingly more favorable that the contraction rate of the glass is lower than the contraction rate of the ferrite and that the difference of both the contraction rates is less than $1.3 \times 10^{-3}$. The glass may have any composition as long as its contraction rate lies within the predetermined range and it fulfills other well-known design conditions.

DETAILED DESCRIPTION OF THE INVENTION

This invention has been made in view of the situation of the prior art, and on the basis of a novel finding achieved by the inventors of this invention as the result of the trial manufacturing of a large number of magnetic heads having various crystal orientations with single-crystal Mn—Zn ferrites of various compositions for studying the relations between the write and read characteristics of the manufactured magnetic heads and the circumstances of arrayal of the crystal axes of the ferrites in the vicinities of gaps. In particular, a tensile stress is caused to act within the ferrite in the vicinity of the gap portion of a magnetic core, to simplify the distribution of easy axes of magnetization of magnetic anisotropy in the vicinity of the gap portion and to optimize the orientation of the easy axes of magnetization on both the sides of the gap, thereby intending to provide a magnetic head which has especially excellent write and read characteristics.

Figure 1:
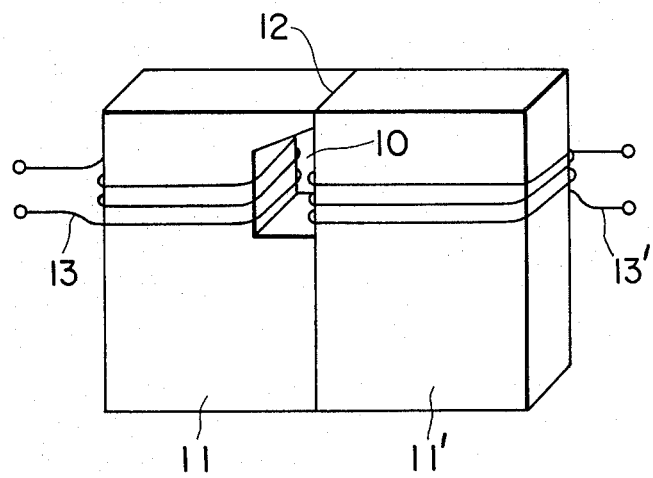
FIG. 1 is a perspective view showing the structure of a prior art magnetic head.
Figure 2:
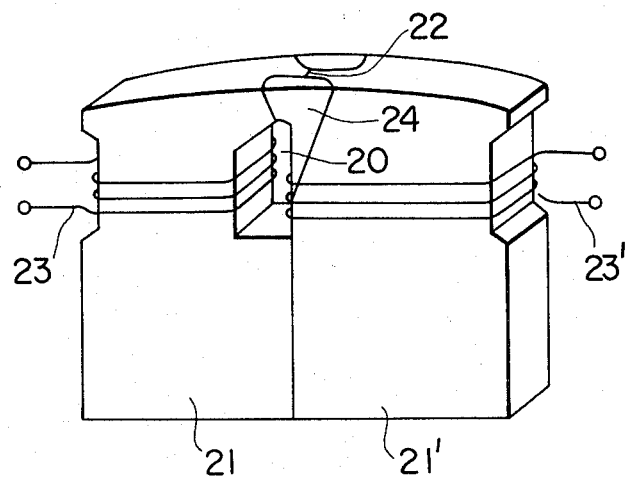
FIG. 2 is a perspective view showing a magnetic head in an embodiment of this invention incorporated into a prior-art type of magnetic head.

As already stated, the performance of a magnetic head is intensely dominated by the magnetic characteristics of the vicinity of the gap portion. This tendency for the performance of the magnetic head to be so intensely dominated by the magnetic characteristics of the vicinity of the gap portion becomes increasingly conspicuous in a magnetic head of the type shown in FIG. 2 having a shape in which the parts other than the vicinity of a gap have the thickness of the magnetic core made as great as possible in order to narrow a track width in the extreme while holding a mechanical strength. Also this type of magnetic head allows making the total magnetic reluctance of the magnetic core low, as in, for example, a magnetic head in a recent household video tape recorder. Accordingly, the characteristics of the magnetic head ought to vary greatly in dependence upon the directions of the easy axes of magnetization and therefore upon the circumstances of orientation of the crystal axes of the single-crystal axes in the vicinity of the gap portion. In FIG. 2, numeral 20 designates a coil winding window, numerals 21 and 21' ferrite blocks, numeral 22 a gap, numerals 23 and 23' coils, and numeral 24 a filling glass.

Although the single-crystal Mn—Zn ferrite usually used for the magnetic head exhibits a small average magnetostriction constant, the magnetostriction coefficients in the <1 0 0> direction and <1 1 1> direction respectively denoted by $\lambda_{100}$ and $\lambda_{111}$ are both on the order of $3-10 \times 10^{-6}$ although their signs are opposite. It is known that a deformed layer being several hundreds nm—several $\mu$m deep is formed in a ferrite surface worked by a conventional working method, in other words, with an outer blade slicer, a dicing machine, a wire saw or the like, and that a tensile stress develops within the ferrite on account of the deformed layer. However, detailed data on what extent of stress actually develops has not been obtained.

Further, the surface of the magnetic head which faces a recording medium is usually lapped with a lapping tape, and the surface facing the recording medium inevitably contacts with the recording medium not only in a magnetic tape apparatus but also in a floating head type magnetic disk apparatus. Such working effects attributed to the lapping and the contact are not negligible, either. Accordingly, how the magnetic anisotropy axes in the vicinity of the gap portion in the operating state of the magnetic head made of the single-crystal Mn—Zn ferrite are actually distributed is ordinarily within the limits of conjecture.

For test purposes, a disk of a single-crystal Mn—Zn ferrite (having a composition of $Fe_2O_3$; 54 mol-%, MnO; 27 mol-%, and ZnO; 19 mol-% and an expansion coefficient of $1.17 \times 10^{-5}$ deg$^{-1}$) in which the {1 1 0} plane was a large area was fabricated by the working method described above, and magnetic permeabilities within the plane were measured. As a result, it has been revealed that the permeabilities exhibit a marked anisotropy in the 180°-symmetry and that the direction of the maximum permeability varies depending upon measurement frequencies.

More specifically, on a lower frequency side, the permeability reaches a maximum in the <1 1 0> direction within the {1 1 0} plane and becomes a minimum in the direction perpendicular thereto or in the <1 0 0> direction. This relationship is inversed on a higher frequency side. This fact indicates that, when the ferrite disk is observed within the {1 1 0} plane, the easy axes of magnetization are induced in the <1 1 0> direction within the plane. The magnetocrystalline anisotropy constant $K_1$ of the material of the ferrite disk is positive and on the order of $2-4 \times 10^3$ erg/cc. If there are no working effects involved, the <1 0 0> direction perpendicular to the <1 1 0> direction ought to be the easy axis of magnetization. The ratio between the maximum and minimum permeabilities observed with the ferrite disk exhibits, for example, a value of 2-5 in a frequency region of 3-5 MHz.

Figure 3:
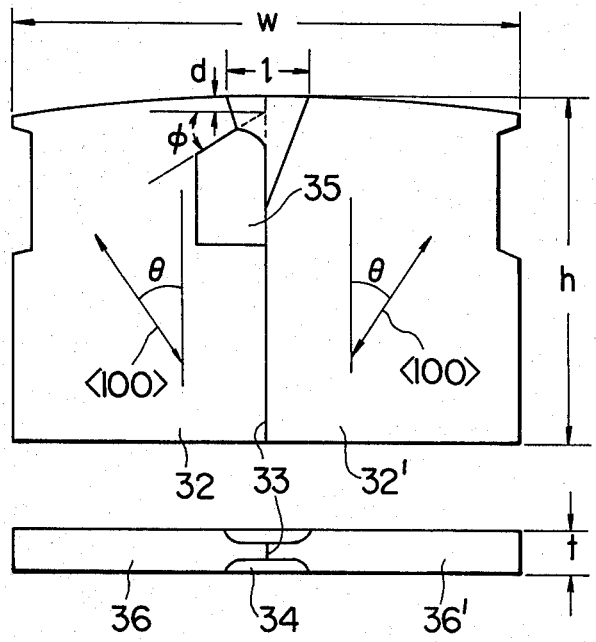
FIG. 3 illustrates a front view and a plan view showing a magnetic head core in an embodiment of this invention.

If magnetic heads as shown in FIG. 2 are fabricated with such material and by the working method as described above, their write and read characteristics will naturally vary conspicuously depending upon the orientations of crystal axes in gap portions. On the basis of such knowledge, magnetic cores as shown in FIG. 3 and indicated in Table 1 were fabricated by the use of single-crystal ferrite blocks having the same composition as that of the aforecited single-crystal Mn—Zn ferrite, and magnetic heads in which coils were wound on the magnetic cores had their write and read characteristics measured. That is, the write and read characteristics of magnetic heads were compared and assessed, the magnetic heads employing magnetic cores in which principal magnetic circuit-forming surfaces 32 and 32' of the magnetic cores having various dimensions as listed in Table 1 were the {1 1 0} plane and in which the angle $\theta$ defined between the <1 0 0> direction included within the principal magnetic circuit-forming plane and a gap forming plane 33 was variously changed.

TABLE 1

| | |
|---|---|
| l | 0.20 mm |
| w | 2.33 mm |
| h | 1.75 mm |
| t | 0.14 mm |
| $\phi$ | 30° |
| d | 50 $\mu$m |

In FIG. 3, numeral 34 indicates a filling glass, numerals 36 and 36' ferrite blocks, and numeral 35 a coil winding window. In manufacturing the magnetic heads, the glass 34 was buried on both the sides of the gap to the end of protecting the gap portion. As the filling glass 34, a glass having the same extent of contraction rate as that of the single-crystal Mn—Zn ferrite of the aforecited composition and having a thermal expansion coefficient of approximately $1.05 \times 10^{-5}$ deg$^{-1}$ was used lest a stress due to the difference of the contraction rates of the ferrite and the filling glass should develop within the ferrite. A method of preparing the filling glass 34 will be explained in an example to be stated later.

Figure 4:
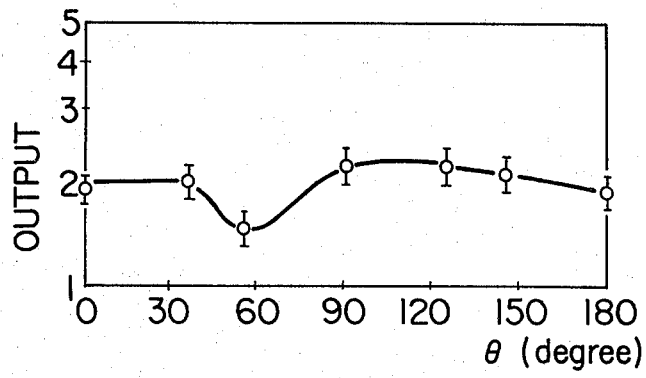
FIG. 4 is a graph showing the relationship between the angle $\theta$ and the head output, of a magnetic head employing a glass whose contraction rate is approximately equal to the contraction rate of a ferrite.

The assessment results of the write and read characteristics of the magnetic heads thus manufactured are illustrated in FIG. 4. FIG. 4 is a graph showing the relationship between the angle defined by the <1 0 0> direction existent within the {1 1 0} plane existing in parallel with the principal magnetic circuit-forming surfaces 32 and 32' and the gap forming plane 33, that is, $\theta$ (in degree) in FIG. 3 and the head output of the magnetic head (relative output in an arbitrary unit). The measurement in this case was conducted at a write wavelength of 1.4 $\mu$m and a frequency of 4 MHz.

As apparent from FIG. 4, when the angle $\theta$ is near 60° the characteristic lowers to some extent, but at the other values of the angle $\theta$ the head output is not considerably dependent upon $\theta$. This signifies that magnetic anisotropies which the ferrite ought to have in the vicinity of the gap portion are averaged for some reason.

The fabricating process of the trial manufactured heads is a process which is generally and ordinarily carried out, except for the manner of setting crystal orientation. It is also very common to employ the filling glass 34 which has the same extent of contraction rate as that of the ferrite. This means that the magnetic anisotropy which the single-crystal ferrite ought to have is not fully utilized in the single-crystal ferrite magnetic head manufactured by the prior art.

The inventors of this invention have thus determined that if the internal stress is deliberately generated in the vicinity of the gap, thereby causing the magnetic anisotropy in the vicinity of the gap to appear definitely, and the orientations of the axes of the magnetic anisotropy are optimized, full exploitation will be achieved of the effect of the magnetic anisotropy to enhance the write and read characteristics of the magnetic head.

DESCRIPTION OF THE PRESENTLY PREFERRED EMBODIMENTS

Hereunder, this invention will be described more in detail in connection with an example.

EXAMPLE

On the basis of the fundamental idea described before, magnetic heads of the structure shown in FIG. 2 which were the same as the trial manufacture heads except that the filling glass 34 was varied to have multifarious thermal expansion coefficients (that is, to have multifarious contraction rates). The relationship *between* the angle defined by the $<1\,0\,0>$ direction existent within the $\{1\,1\,0\}$ plane existing in parallel with the principal magnetic circuit-forming surfaces 32 and 32' and the gap forming plane 33, that is, $\theta$ in FIG. 3 *and* the recording playback output of the magnetic head was evaluated. The thermal expansion coefficients $\alpha$ (averaged over a range from room temperature to a temperature of 350° C.) of the filling glasses employed were $74 \times 10^{-7}$ deg$^{-1}$ ($-1.3 \times 10^{-3}$), $80 \times 10^{-7}$ deg$^{-1}$ ($-1.0 \times 10^{-3}$), $87 \times 10^{-7}$ deg$^{-1}$ ($-0.7 \times 10^{-3}$), $96 \times 10^{-7}$ deg$^{-1}$ ($-0.4 \times 10^{-3}$), $101 \times 10^{-7}$ deg$^{-1}$ ($-0.2 \times 10^{-3}$) and $105 \times 10^{-7}$ deg$^{-1}$ (0), where deg$^{-1}$ is in terms of centigrade, and where the setting temperature was in the range 400° C. to 500° C. in all the cases. Values in the above parentheses are values $\beta$ obtained by subtracting the contraction rate of the ferrite from the contraction rates of the filling glasses from the setting temperature to room temperature.

The filling glasses 34 were such that a glass which had a composition consisting of 27% of ZnO, 8% of Na$_2$O, 8% of BaO, 16% of SiO$_2$, 4% of Al$_2$O$_3$ and 37% of B$_2$O$_3$ and of which $\alpha$ was $74 \times 10^{-7}$ deg$^{-1}$ and $\beta$ was $-1.3 \times 10^{-3}$ and a glass which had a composition consisting of 29% of ZnO, 3% of Na$_2$O, 8% of K$_2$O, 14% of BaO, 4% of CaO, 4% of SrO, 9% of SiO$_2$, 23% of B$_2$O$_3$, 5% of TiO$_2$ and 1% of Li$_2$O as well as impurities and of which $\alpha$ was $107 \times 10^{-7}$ deg$^{-1}$ and $\beta$ was $0.1 \times 10^{-3}$ were mixed in proportions establishing the above-mentioned values $\alpha$ and $\beta$. The glass compositions are indicated by weight-%.

Figure 5:
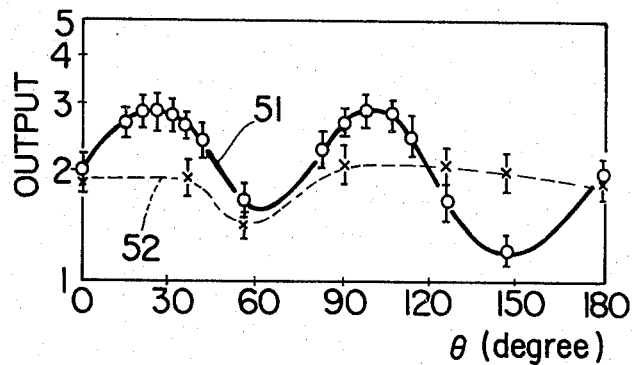
FIG. 5 is a graph showing the relationship between the angle $\theta$ and the head output, of a magnetic head employing a glass whose contraction rate exhibits a difference $\beta$ of $-0.7 \times 10^{-3}$ or 0 with respect to the contraction rate of a ferrite.
Figure 6:
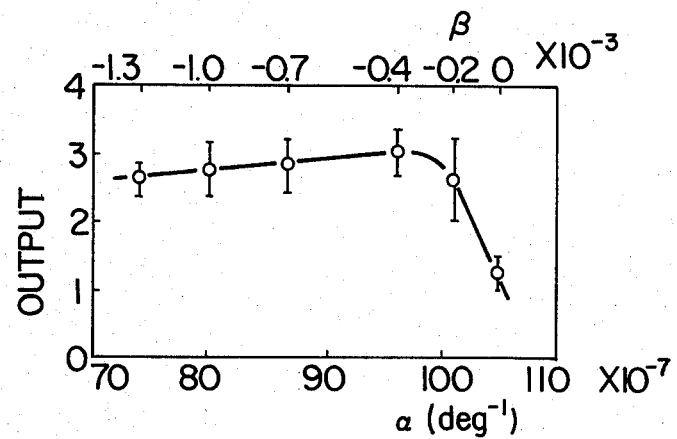
FIG. 6 is a graph showing the relationship between the difference $\beta$ or the coefficient of thermal expansion $\alpha$ of a filling glass, of a magnetic head in which the angle $\theta$ is 25°.

Measured results are illustrated in FIGS. 5 and 6. FIG. 5 is a graph showing the relationship between the head output (relative output in an arbitrary unit) and the angle $\theta$ (in degree). Numeral 51 designates a curve in the case of using the glass of which $\alpha$ was $87 \times 10^{-7}$ deg$^{-1}$ ($\beta$ was $-0.7 \times 10^{-3}$), and numeral 52 a curve in the case of using the glass of which $\alpha$ was $105 \times 10^{-7}$ deg$^{-1}$ ($\beta$ was 0). FIG. 6 is a graph showing the relationship between the head output (relative output in an arbitrary unit) and the coefficient $\alpha$ as well as the difference $\beta$ in the case where the angle $\theta$ was 25°. The recording playback characteristics shown in FIGS. 5 and 6 were obtained at a recording wavelength of 1.4 $\mu$m and a frequency of 4 MHz.

The selection of the coefficient $\alpha$ in this example was so made that a stress in the interface between the vicinity of the side of the gap portion and the filling glass as generated with a temperature variation during the fusing attachment of the filling glass became tensile with respect to the ferrite core side, to further promote a stress owing to the deformed layer of the ferrite in the vicinity of the side, thereby intensifying the magnetic anisotropy in the vicinity of the side of the gap portion.

Contrary to expectation, the $\theta$-dependency of the recording playback characteristics of the magnetic head according to the present embodiment exhibit a very clear four-figure symmetry. More important is that, by thus intensifying the magnetic anisotropy in the vicinity of the gap portion and putting the angle $\theta$ in a proper range, a magnetic head of extraordinarily favorable characteristics is obtained which could not be achieved by the prior art. Although the recording playback characteristics shown in FIG. 5 correspond to the recording wavelength of 1.4 $\mu$m and the frequency of 4 MHz, such $\theta$-dependency is also noted in a recording wavelength range of 1–20 $\mu$m and a frequency range of 0.3–6 MHz, and the characteristics become substantially similar to those of FIG. 5 except that the ratio between the maximum value and the minimum value of the head output somewhat differs. When various recording media having coercive forces of 300–1,700 Oe were employed, similar characteristics were obtained in all the cases.

As apparent from FIG. 5, although values of the angle $\theta$ in a range of 5°–40° or 80°–120° bring forth favorable recording playback characteristics, a more preferable range of $\theta$ is 10°–35° or 85°–115°, a still more preferable range of $\theta$ is 20°–30° or 95°–105°, and a value of $\theta$ equal to about 25° or about 100° produces the most favorable result. A magnetic head in which the angle $\theta$ producing the most favorable result is near 25° and a magnetic head in which the same is near 100° become symmetric concerning the value of Q. That is, in a frequency range of 1–6 MHz, Q reaches a maximum value with $\theta$ being near 25° and a minimum value with $\theta$ being near 100°.

Among the magnetic heads in the present embodiment, some samples of the magnetic head employing the filling glass with $\alpha$ being $74 \times 10^{-7}$ deg$^{-1}$ ($\beta$ being $-1.3 \times 10^{-3}$) underwent cracks in the vicinities of the gaps. It turns out that the available percentage of yield in the magnetic head fabrication degrades when the difference $\beta$ is lower than this value.

The tensile stress $\delta$ which is conjectured to have developed in the center of the sides (the interfaces between the filling glass 34 and the ferrite blocks 36, 36') of the gap of the magnetic head in the present embodiment is at most 2–3 kg/mm$^2$. The magnetostriction constants $\lambda_{100}$ and $\lambda_{111}$ of the Mn—Zn ferrite usually employed are $-5 \times 10^{-6}$ to $-10 \times 10^{-6}$ and $3 \times 10^{-6}$ to $7 \times 10^{-6}$, respectively. In order that the $<1\,1\,0>$ direction within the $\{1\,1\,0\}$ plane of the single-crystal ferrite having such magnetostriction constants may be made the easy axis of magnetization by applying the tensile stress of 2–3 kg/mm$^2$ to the $\{1\,1\,0\}$ plane, the magnetocrystalline anisotropy constant $K_1$ of the single-crystal ferrite must be a value in a certain range. In principle, the sign of the constant $K_1$ is also concerned. In a case where $K_1 > 0$, the effect is expected in a range of $K_1$ expressed by $K_1 < 3|\lambda_{111}\delta|$, and in case where $K_1 < 0$, it is expected in a range of $K_1$ expressed by $|K_1| < 3|(\lambda_{100} - \lambda_{111})\delta|$. When the above-mentioned values of $\lambda_{100}$, $\lambda_{111}$ and $\delta$ are employed, the range of $K_1$ values in which the effect is expected becomes $-2 \times 10^{-4}$ erg/cc to $1 \times 10^4$ erg/cc. This range of $K_1$ values has ignored the existence of an anisotropy constant $K_2$ which is said to be small in ordinary ferrites. When the existence of $K_2$ and the security are taken into account, a more preferable range of $K_1$ becomes $-1.5 \times 10^4$ erg/cc to $8 \times 10^3$ erg/cc. The constant $K_1$ of the Mn—Zn ferrite exhibits a tendency to increase by increasing the $Fe_2O_3$ content in case of, for example, a composition in which $Fe_2O_3$ is near 50 mol-%.

As seen from FIG. 6, when the value of the difference $\beta$ is negative the effect of this invention is noted, and when the former is not greater than $-0.2 \times 10^{-3}$ a more favorable result is obtained as stated previously, when the value of the difference $\beta$ is not less than $-1.3 \times 10^{-3}$, the occurrence of cracks is not noted and a good result is obtained. Accordingly, a more preferable range of $\beta$ values is $-0.2 \times 10^{-3}$ to $-1.3 \times 10^{-3}$.

The measured results illustrated in FIGS. 4, 5 and 6 were obtained for the magnetic heads which employed the single-crystal Mn—Zn ferrite having a composition consisting of 54 mol-% of $Fe_2O_3$, 27 mol-% of MnO and 19 mol-% of ZnO. Similar experiments to the above were conducted by the use of single-crystal Mn—Zn ferrites of various compositions listed in Table 2. Then, in cases of the ferrites of all of these compositions, magnetic heads having write and read characteristics superior to the maximum performance with the prior art could attain were obtained in the aforecited ranges of $\theta$ and $\beta$. The experiments were carried out with the values of $K_1$ being $-1.5 \times 10^4$ to $2 \times 10^3$ erg/cc. In this regard, in the case of $-1.5 \times 10^4$ erg/cc, an internal stress application effect approximately equal to that in the case of $8 \times 10^3$ erg/cc is attained. It can therefore be said that the experiments employing the ferrites of the compositions indicated in Table 2 have revealed that good results can be expected in a range of $K_1$ of from $-1.5 \times 10^4$ to $8 \times 10^3$ erg/cc.

TABLE 2

| Sample No. | $Fe_2O_3$ (mol-%) | MnO (mol-%) | ZnO (mol-%) | $K_1$ (erg/cc) |
|---|---|---|---|---|
| 21 | 55.0 | 27.5 | 17.5 | $1 \times 10^3$ |
| 22 | 53.5 | 28.5 | 18.0 | $<1 \times 10^3$ |
| 23 | 51.0 | 30.0 | 19.0 | $-1 \times 10^3$ |
| 24 | 54.0 | 29.0 | 17.0 | $2 \times 10^3$ |
| 25 | 52.5 | 35.5 | 12.0 | $-1.5 \times 10^4$ |

All the characteristics of the magnetic heads described above were obtained for the magnetic heads in which the taper angle $\phi$ of the winding window 35 and the length l of a narrowed part in the gap portion as illustrated in FIG. 3 were restricted to the values indicated in Table 1. When experiments were conducted on magnetic heads in which the angle $\phi$ and the length l were variously changed in respective ranges of 60°-30° and 50-500 μm as indicated in Table 3, head output characteristics having $\theta$-dependencies similar to the foregoing were obtained.

TABLE 3

| Sample No. | l | $\phi$ |
|---|---|---|
| 31 | 100 μm | 45° |
| 32 | 200 μm | 45° |
| 33 | 500 μm | 45° |
| 34 | 200 μm | 30° |
| 35 | 200 μm | 60° |

Figure 7:
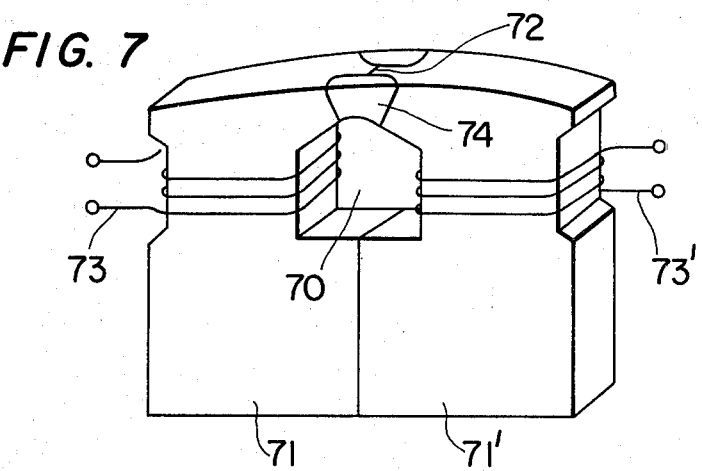
FIG. 7 is a perspective view showing a magnetic head according to another embodiment of this invention.

Further, the magnetic heads employed in the measurements above stated had the shape of the winding window 35 made bilaterally asymmetric as shown in FIG. 3, but measurement results obtained for magnetic heads in which the shape was made symmetric as shown in FIG. 7 were similar to the foregoing. In FIG. 7, numeral 70 indicates a winding window, numerals 71 and 71' ferrite blocks, numeral 72 a gap, numerals 73 and 73' coils, and numeral 74 a filling glass.

In a case where, in the magnetic head of this invention, the principal magnetic circuit-forming plane is constructed of the truly {1 1 0} plane as described above, the excellent effect as above stated is, of course, achieved. However, characteristics approximately equivalent to the foregoing were obtained with magnetic heads in which the principal magnetic circuit-forming plane was inclined in a range of about ±15° relative to the {1 1 0} plane.

In the above embodiments, both the magnetic blocks opposing to each other with the gap intervening therebetween were made of the Mn—Zn single-crystal ferrite, and the crystal axes of the single-crystals were arranged so as to be substantially symmetric with respect to the gap forming plane. As apparent from the description thus far made, however, even when the orientations of the crystal axes are made asymmetric, a similar effect can be expected by confining within the aforecited range the angle $\theta$ which is defined between the <1 0 0> direction of both the crystals and the gap forming plane. Also in a case where the condition of the angle $\theta$ is satisfied for only one ferrite, or in a case where only one of the magnetic blocks is made of the single-crystal Mn—Zn ferrite and where the condition of the angle $\theta$ is satisfied, the effect of this invention can be expected.

While we have shown and described several embodiments in accordance with the present invention, it is understood that the same is not limited thereto but is susceptible to numerous changes and modifications as known to those skilled in the art and we therefore do not wish to be limited to the details shown and described herein but intend to cover all such changes and modifications as are encompassed by the scope of the appended claims.

We claim:

1. A magnetic head comprising two magnetic blocks of high permeability which oppose to each other with a gap intervening therebetween, at least one of said magnetic blocks of high permeability being made of a single-crystal Mn—Zn ferrite, a {1 1 0} plane of the at least one single-crystal Mn—Zn ferrite being made substantially parallel to a principal magnetic circuit-forming plane, an angle $\theta$ between a <1 0 0> direction existent within said {1 1 0} plane and a plane forming said gap being made 5°-40° or 80°-120°, a glass being attached by fusion onto at least surfaces of the high-permeability magnetic block in the vicinities of sides of said gap, said glass having a lower contraction rate than said ferrite in a case of lowering the temperatures thereof from a glass setting temperature to a room temperature, and wherein a magnetocrystalline anisotropy constant $K_1$ of said single-crystal Mn—Zn ferrite is $-2 \times 10^4$ to $1 \times 10^4$ erg/cc.

2. A magnetic head according to claim 1, wherein said angle $\theta$ is made 10°-35° or 85°-115°.

3. A magnetic head according to claim 1, wherein said angle $\theta$ is made 20°-30° or 95°-105°.

4. A magnetic head according to claim 1, wherein said angle $\theta$ is made approximately 25° or approximately 100°.

5. A magnetic head according to claim 1, 2, 3 or 4, wherein a value obtained by subtracting the contraction rate of said ferrite from the contraction rate of said glass in the case of lowering the glass setting temperature to the room temperature is $-0.2 \times 10^{-3}$ to $-1.3 \times 10^{-3}$.

6. A magnetic head according to claim 1, 2, 3 or 4, wherein a magnetocrystalline anisotropy constant $K_1$ of said single-crystal Mn—Zn ferrite is $-1.5 \times 10^4$ to $8 \times 10^3$ erg/cc.

7. A magnetic head comprising two magnetic blocks of high permeability which oppose to each other with a gap intervening therebetween, at least one of said magnetic blocks of high permeability being made of a single-crystal Mn—Zn ferrite, a {1 1 0} plane of the at least one single-crystal Mn—Zn ferrite being made substantially parallel to a principal magnetic circuit-forming plane, an angle $\theta$ between a <1 0 0> direction existent within said {1 1 0} plane and a plane forming said gap being made 5°–40° or 80°–120°, a glass being attached by fusion onto at least surfaces of the high-permeability magnetic block in the vicinities of sides of said gap, said glass having a lower contraction rate than said ferrite in a case of lowering the temperatures thereof from a glass setting temperature to a room temperature to generate a tensile stress within the ferrite in the vicinity of the gap, and wherein a magnetocrystalline anisotropy constant $K_1$ of said single-crystal Mn—Zn ferrite is $-2 \times 10^4$ to $1 \times 10^4$ erg/cc.

* * * * *